Figure 1:
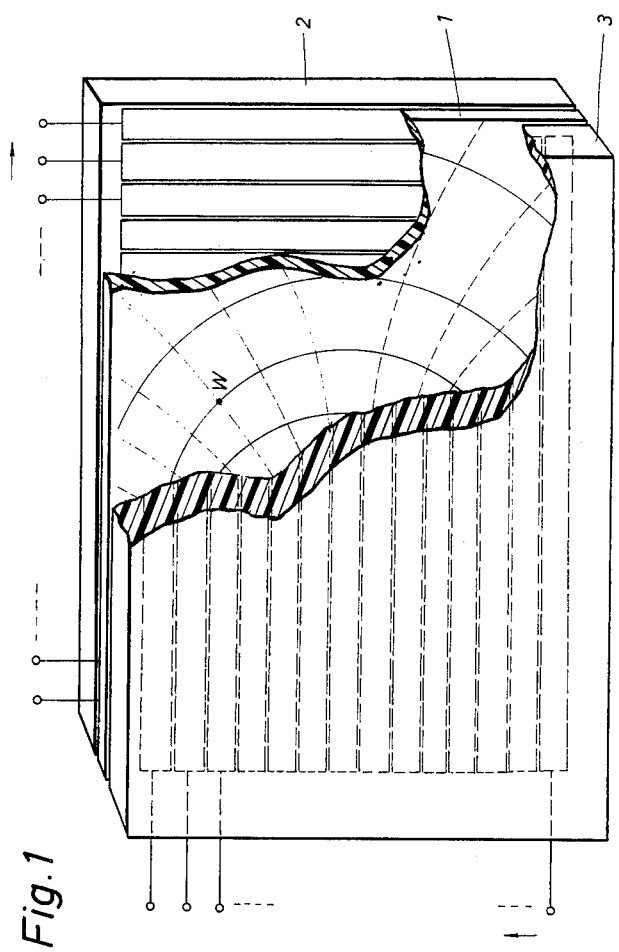

Aug. 24, 1965  F. STEINER  3,202,810
ARITHMETIC UNIT

Filed Nov. 17, 1960  6 Sheets-Sheet 1

INVENTOR
F. STEINER

ATTORNEY

Aug. 24, 1965   F. STEINER   3,202,810
ARITHMETIC UNIT
Filed Nov. 17, 1960   6 Sheets-Sheet 2

INVENTOR
F. STEINER

BY *Robert Harding Jr*
ATTORNEY

Aug. 24, 1965　　　　　　F. STEINER　　　　　　3,202,810
ARITHMETIC UNIT

Filed Nov. 17, 1960　　　　　　　　　　　　　6 Sheets-Sheet 3

INVENTOR
F. STEINER

ATTORNEY

Aug. 24, 1965    F. STEINER    3,202,810
ARITHMETIC UNIT
Filed Nov. 17, 1960    6 Sheets-Sheet 4

INVENTOR
F. STEINER

BY *Robert Harding Jr.*
ATTORNEY

Aug. 24, 1965
F. STEINER
3,202,810
ARITHMETIC UNIT
Filed Nov. 17, 1960
6 Sheets-Sheet 6
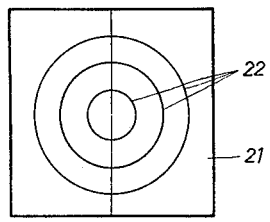
*Fig.9*
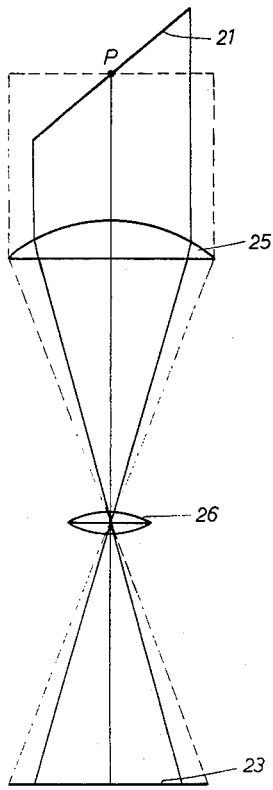
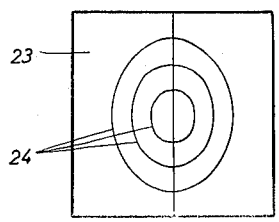
INVENTOR
F. STEINER
BY *Robert Harding Jr.*
ATTORNEY

3,202,810
ARITHMETIC UNIT

Fritz Steiner, Pforzheim, Germany, assignor to International Standard Electric Corporation, New York, N.Y., a corporation of Delaware
Filed Nov. 17, 1960, Ser. No. 69,912
Claims priority, application Germany, Nov. 25, 1959, St 15,837
8 Claims. (Cl. 235—197)

The invention relates to an arrangement for determining the function values of a given function depending on a plurality of variable quantities.

Generally electronic computers are used to determine the function values of a random function. Quite depending on the problem, either digital computers or analog computers are used.

The advantage of the digital computers existing in delivering exact numerical values with a random accuracy of positions, is opposed by the disadvantage according to which all arithmetic operations to be carried out have to be finally traced back to simple additions. For this reason, for example, a transcendental function from which a function value is supposed to be determined, first of all has to be resolved into a series, and thereupon the function values of the individual members have to be determined and summed-up. Since such methods require a considerable technical expenditure and call for a corresponding size (capacity) of the computer with respect to the number of storage positions, etc., digital computers which are often used for carrying out the determination of function values of transcendental functions, employ storage devices in which all function values of the appearing transcendental functions are stored, and which can be interrogated individually in accordance with requirements. As a rule, however, the storing of such "function panels" is only possible and of some sense if the tabulated transcendental function were to depend on one variable only. However, the performance of both the tabulation and storage of functions of several variables would be practically impossible on account of the necessary unproportionally high storage capacity.

The determination of the function value of a transcendental function is substantially simpler when carried out by analog computers. The principal disadvantage of this kind of determination, however, resides in the fact that the accuracy of the resulting value obtainable when using analog computers is relatively low.

The present invention is based on the problem of providing an arithmetic unit suitable for the determination of function values of a given function depending on a plurality of variable quantities. On the one hand this arithmetic unit is supposed to cause a substantially lower technical expenditure compared with that of a digital computer provided for coping with the same problem and, on the other hand, this arithmetic unit is supposed to operate with an accuracy which is higher than that obtainable with the aid of conventional types of analog computers.

For the construction of such an arithmetic unit it is possible to use luminous plates which are known per se from the fields of television engineering. These luminous plates are thin plates of an electroluminescent material, on both sides of which line rasters of a conductive material are arranged, for example, on the back side in the horizontal, and on the front side in the vertical direction. When applying a certain voltage to respectively one line belonging to the front and to the back side, then the electroluminescent material will start to fluoresce (give off light) in the vicinity of the point of intersection of the two lines. Such luminous plates have been already used experimentally e.g. as television picture tubes.

In accordance with a first characteristic of the invention an arithmetic unit is proposed for the determination of function values of a given function depending on a plurality of variable quantities, comprising at least one plate of electroluminescent material, as well as line rasters of a conductive material designed on each side of the plates as different families of curves of the given function, and means for selectively applying a voltage to one of the curves on each side of the plate whereby the electroluminescent material is illuminated at the point of intersection. The unit further comprises means responsive to the illuminated point for providing criteria which correspond to the function values.

In accordance with another characteristic of the invention an arithmetic unit for the determination of the function values of a given function depending on a plurality of variable quantities, in particular of the form $w=u(x,y)+jv(x,y)$ is built up, in accordance with the invention, in such a way that one or more picture plates of an electroluminescent material of the type known per se, with line rasters consisting of a conductive material on both sides, are provided, on which the line rasters are designed as families of curves of the given function, preferably in such a way that on the front side of the plates families of curves $v=\varphi(u,x)$ with $x$ as the parameter, and on the back side families of curves $v=\psi(u,y)$ with $y$ as the parameter are imprinted, which functions $\varphi$ and $\psi$ can be derived from $u(x,y)$ and from $v(x,y)$ and that, in order to determine respectively one function value, means are provided for applying a voltage to respectively one corresponding curve of the families of curves provided on both the front and the back side of the plate, to effect a lighting of the electroluminescent material at the point of intersection of the two curves acted upon by voltage, and that further on one or more reading devices, consisting of respectively one or more reading plates are provided on which the respectively lighted points of intersection are represented and which, quite depending on the position of the represented light spot (illuminated point), provide the criteria which correspond to the wanted function value.

As a reading device it is possible to this end to use either a television camera tube, such as an iconoscope or orthicon, or a photoelectric plate.

In one advantageous type of embodiment it is possible to provide for each reading device two photoelectric reading plates, of which the one transfers corresponding criteria to the first, and the other one to the second coordinate value of a two-dimensional coordinate system. Appropriately, in such a case one such reading device is provided for each picture plate, and the two reading plates thereof are arranged on both sides of the picture plate. The photosensitive layers thereof are positioned to face the picture plate.

The photosensitive layers of the reading plates may be divided into strips, in such a way that the strips of the one reading plate extend rectangularly in relation to those of the other reading plate, so that the photosensitive layers of the two reading plates form a rectangular coordinate system. A corresponding resulting picture point appearing on the picture plate produces photoelectrically a voltage on each time one of two reading plates, thus determining the geometrical position of the picture point in accordance with abscissa and ordinate, by the geometrical position of the two voltage-conducting strips.

On the other hand, however, the photosensitive layer of the one reading plate may also be divided into concentrical rings, and that of the other reading plate may be divided into circular sectors, so that accordingly the photoelectric plates of the two reading plates form a polar coordinate system. A corresponding resulting picture point appearing on the picture plate produces a voltage in the photoelectric way on each time one concentrical ring of the one, and on one circular sector of the other reading plate. In accordance with polar coordinates the geometrical position of the picture point is determined by the geometrical position of both the voltage-conducting concentrical ring and of the voltage-conducting circular sector.

Arrangements according to the invention may be further embodied in that in the case of the one or more picture plates, the points of origin of the individual curves which are to be brought into connection with the source of control voltage, are arranged within regions of an optimum accuracy, and in that the line resistance of the individual curves is dimensioned in such a way that the light intensity of the lighted points of intersection decreases in accordance with a fixed predetermined function as the distance from the points of origin increases, and that furthermore the light intensity of the light spots represented on the reading plate (or reading plates) either serves as a criterion for the accuracy of the obtained function values, or to evaluate the obtained function values.

For the purpose of evaluating the bearing information of a bearing system consisting of three direction finders, it is possible in an inventive type of arithmetic unit, to provide a plurality of picture plates whose control quantities depend on the same object, hence in the given example, on the located aircraft, and which consequently result in approximately equal function values which, however, are subject to tolerances, and scatter around a mean value, and are delivered by the one or more reading devices and fed to an evaluating arrangement which carries out the formation of a mean value of the function values on account of the evaluation of the light intensity of the light spots effecting the issue of these function values.

In an arithmetic unit of this type it is possible to provide one single reading device for the above mentioned plurality of picture plates, on which the lighted picture points of the individual picture plates are projected in such a way that picture points having the same position on the individual picture plates appear as one single light spot on the one (or more) reading plates of the reading device, or otherwise it is equally possible that a corresponding plurality of autonomous picture-plate systems can be connected electrically in parallel, in such a way that corresponding outputs of the reading devices with respect to the individual picture-plate systems are connected in parallel.

Certain types of arithmetic units in which the reading arrangements consist of photoelectric plates, and in which two reading plates are provided for each reading device, of which reading plates the one provides the first, and the other one the second coordinate value of a two-dimensional coordinate system with the corresponding criteria, may be provided in accordance with an advantageous further embodiment of the invention with an evaluating arrangement which is designed in such a way that for each of the two coordinate-counting directions there is provided a number of amplifier circuits, such as transistor circuits, which correspond to the number of output lines of this counting direction. Each of these amplifier circuits is designed in a way that the current delivered by the output line connected to the amplifier circuit is multiplied with the coordinate value of the output line. Furthermore, all amplifier circuits of one counting arrangement can be connected together in a way that the currents delivered by them are added to one another, and that a quotient former is provided for dividing the sum of all currents of one counting direction, which are multiplied by the coordinate value of the corresponding output line, by the sum of the currents delivered to this particular counting direction by the output lines, which sum of currents e.g. flows through an earth circuit common to all output lines of the counting direction, so that the result provided by the quotient former corresponds to the mean value of the coordinate value of this counting direction evaluated by the light intensity of the light spots producing the individual currents.

According to another modified embodiment of the invention it is possible in arithmetic units, in which a projector is provided for projecting the picture points from the picture plate to the reading device, to design this projection device (projector) in such a way that the imaging function of the families of curves imprinted on the picture plate, upon the reading plate is generally a function of the variable plotted in the abscissa- and ordinate-direction of the plane of the picture plate, so that for instance by an imaging function which corresponds to the distortion of an axis, a family of concentrical circles on the picture plate is imaged on the reading plate as a family of ellipses with a constant ellipticity coefficient. Such an arithmetic unit can be designed in such a way that the imaging function is variable, for example, by a projector which is variable in a suitable way, or by differently arranging both the picture and reading plates.

As a rule, arithmetic units according to the invention can be advantageously used for the transformation of coordinates in complex planes, preferably for the conformal representation.

Another advantageous field for the practical employment of arithmetic units according to the invention is that of the so-called triangulators to carry out trigonometric calculations.

Arithmethic units according to the invention have the special advantage of providing a relatively high accuracy at relatively low costs.

Figure 2:
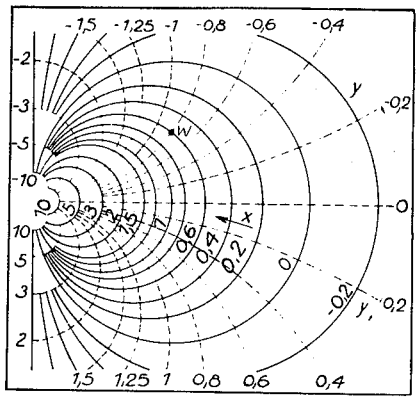

The invention will now be described in detail with reference to FIGS. 1–9 of the accompanying drawings, in which:

FIG. 1 shows an arrangement according to the invention, consisting of a picture plate and one reading plate each for the two coordinates, FIG. 2 shows a picture plate for the conformal representation of the complex form $$w = \frac{1-z}{1+z}$$

Figure 3:
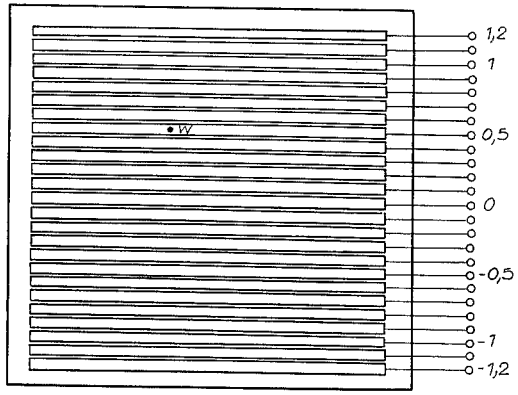
Figure 4:
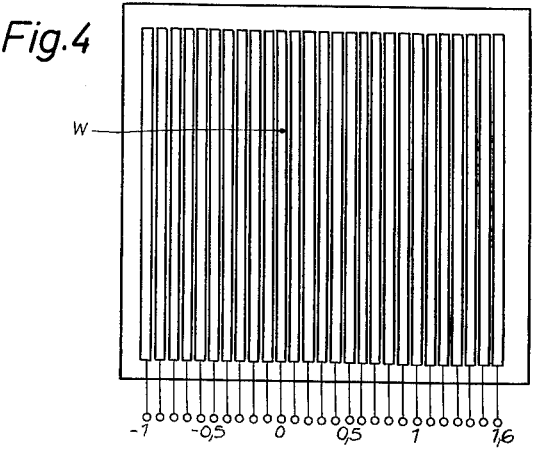
Figure 5A:
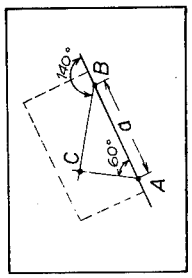
Figure 5:
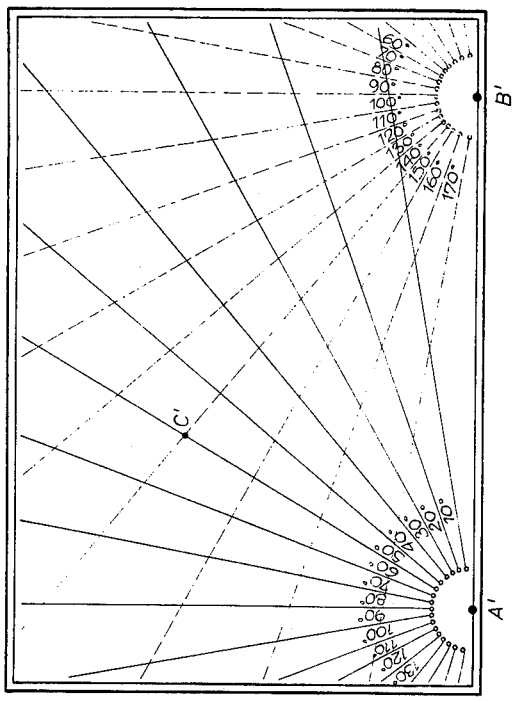
Figure 6:
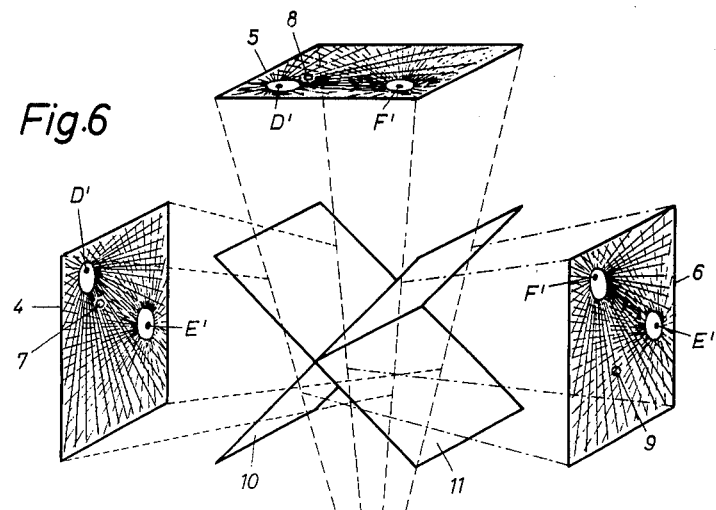
Figure 8:
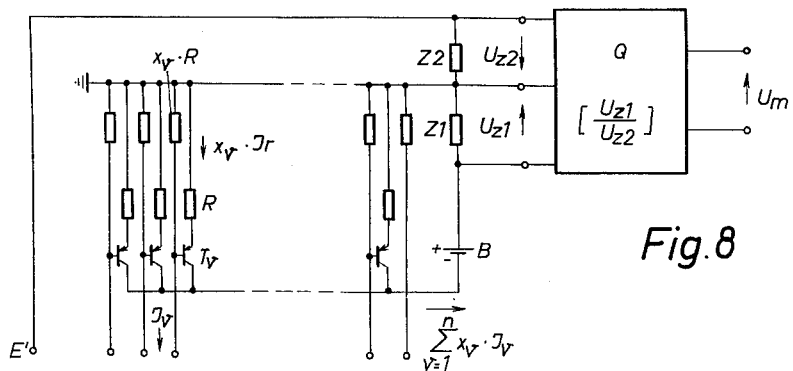
Figure 7:
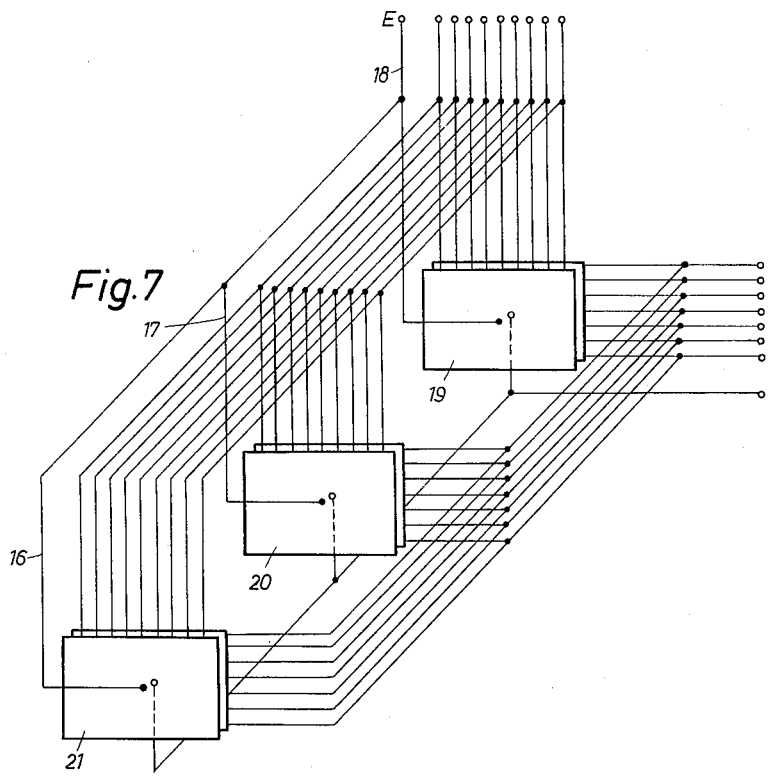

FIG. 3 shows a reading plate for issuing the coordinate values in the vertical direction for the picture plate shown in FIG. 2, FIG. 4 shows a reading plate for issuing the coordinate values in the horizontal direction for the picture plate shown in FIG. 2, FIG. 5 shows a picture plate suitable e.g. for evaluating the bearing information of two direction finders, FIG. 6 shows an inventive arrangement for triangulators to carry out trigonometric calculations, in which the measuring results (picture points) delivered by several picture plates, are projected on a reading device, FIG. 7 shows an inventive arrangement for triangulators to carry out trigonometric calculations, comprising three autonomous picture plate systems the reading plates of which are electrically connected in parallel, FIG. 8 shows an evaluating circuit for evaluating the results delivered by the reading plates, as well as for forming a mean value, FIG. 9 shows an inventive arrangement with a variable function of imaging the families of curves as imprinted on the picture plate, upon the reading plate.

The principal mode of operation of the invention will be described in detail with reference to FIGS. 1–4.

First of all the construction of a picture plate will be explained with reference to FIG. 2. As an example it is assumed that the arithmetic unit according to the invention is used to determine the complex form $$w = f(z) = \frac{1-z}{1+z}$$

This given function is first of all to be brought into the form $$w = u(x,y) + jv(x,y)$$

From $z=x+jy$ the following results with respect to the functions $u(x,y)$ and $v(x,y)$ $$u(x,y)=\frac{1-x^2-y^2}{(1+x)^2+y^2} \quad v(x,y)=-\frac{2y}{(1+x)^2+y^2}$$

From these two equations, by eliminating the variable quantity $y$, there is obtained an equation $v=\alpha(u,x)$, and by eliminating the variable quantity $x$, there is obtained an equation $v=\psi(u,y)$:

$$v=\varphi(u,x)=\pm\sqrt{\frac{1}{(1+x)^2}-\left(u+\frac{1}{1+x}\right)^2}$$

$$v=\psi(u,y)=\pm\sqrt{\left(\frac{1}{y}\right)^2-(u+1)^2}$$

or else in a clearer representation:

$$v=\varphi(u,x) \rightarrow v^2+\left(u+\frac{x}{1+x}\right)^2=\left(\frac{1}{1+x}\right)^2$$

$$v=\psi(u,y) \rightarrow \left(v+\frac{1}{y}\right)^2+(u+1)^2=\left(\frac{1}{y}\right)^2$$

Both equations describe circles for a constant $x$ or $y$ respectively, lying in the w-plane, i.e. the first one circles with the radius $$v=\frac{1}{1+x}$$

around the centre $$(u/v)=\left(-\frac{x}{1+x}/0\right)$$

and the second one circles with the radius $$v=\frac{1}{y}$$

around the centre $$(u/v)=\left(-\frac{1}{y}\right)$$

In the case of a fixed predetermined $x$ the results $w=f(z)$ must be plotted on the curve $v=\varphi(u,x)$, and in the case of a fixed predetermined $y$ on the curve $v=\psi(u,y)$. If both $x$ as well as $y$ are fixed and predetermined, then the result $w=f(z)$ must be plotted on both curves $v=\varphi(u,x)$ and $v=\psi(u,y)$ and, consequently, in the point of intersection of both curves.

In the picture plate as shown in FIG. 2 the family of curves $v=\varphi(u,x)$ which, as already mentioned hereinbefore, appears as a family of circles with the centres lying on the u-axis, is imprinted on the front side of the picture plate, and the family of curves $v=\psi(u,y)$ which, as already mentioned hereinbefore, appears as a family of circles with the centres lying on the vertical line $u=-1$, is imprinted on the back side of the picture plate.

In order to make it clear that the family of curves $v=\varphi(u,x)$ is imprinted on the front side and the family of curves $v=\psi(u,y)$ on the back side of the picture plate, the first family of curves is represented by a solid line, while the second family of curves is represented by a dashline.

The individual curves consist of conductive material and are connected to a selecting device, by means of which voltage is respectively applied to one of the curves imprinted on the front and back side of the picture plate.

In order to prevent the individual curves of a family of curves from coming into contact with one another, the continuation of a part of the curves in sections in which all curves run together, has to be avoided. In the chosen example, all curves relating to the function $v=\varphi(u,x)$ as well as to the function $v=\psi(u,y)$ run together in the vicinity of point $(u/v)=(-1/0)$ (see FIG. 2, left-hand side, mean height) and have in the mentioned point a common function value. For avoiding the establishment of a contact the curves running closely together are already broken away in the vicinity of point $(-1/0)$.

Furthermore, for reasons of clarity only a limited number of curves is represented in FIG. 2; in a practical embodiment, however, the curves would lie much closer to one another, so that practically the entire plane of the picture plate would be covered with curves.

For the determination of a value $w(z)$ voltage is now applied to respectively one curve of the families of curves provided on the front and back side of the picture plate, that is, to those two curves whose parameters $x$ and $y$ correspond to the values $x$ and $y$ of the fixed predetermined value $z$. Consequently, a lighting of the picture plate consisting of electroluminescent material is effected at the point of intersection of the two curves, hence at the wanted function value $w$. If the fixed predetermined value is e.g. for $z=0,6-j0,8$, hence $x=0,6$ and $y=-0,8$, then the lighting of the picture plate is effected at point $w$, as shown in FIG. 2.

In FIG. 1 there is shown the arrangement of the reading plates, and FIGS. 3 and 4 show the construction thereof. The reading plates consist of photoelectric plates whose photosensitive layers are divided into parallel strips, i.e. on the one reading plate in horizontally extending strips (FIG. 3) and on the other reading plate in vertically extending strips (FIG. 4). The two reading plates 2 and 3 are positioned on either side of the picture plate 1 (FIG. 1), and their photosensitive layers are arranged to face the picture plate. If a picture point, e.g. point $w$, is lighted on the picture plate 1, then a voltage is photoelectrically produced in the strip opposing this picture point, hence in respectively one vertical and one horizontal strip. The coordinate values of the illuminated picture point are therefore determined in accordance with abscissa and coordinate by the geometrical position of the two voltage-conducting strips. If the strips, e.g. as shown in FIGS. 3 and 4, are numbered according to coordinate values, then the coordinate values of the picture point $w$ imaged on the reading plates are determined by the two voltage-conducting strips, in the given example by the strips designated $u=0$ and $v=0,5$. Hence, in the given example it results that $w=0+j0,5$ if, as presupposed, $z=0,6-j0,8$.

In the embodiment, shown in FIG. 1, of an inventive arithmetic unit, the photosensitive layers divided into strips of the two reading plates form a rectangular coordinate system, whereby to each strip there is assigned a coordinate value corresponding to its geometrical position. However, just as well the photosensitive layer of the one reading plate may be divided into concentrical rings and that of the other reading plate into circular sectors, so that the photoelectric layers of both reading plates form a polar coordinate system.

A particularly optimum possibility of using the inventive arithmetic units consists in the evaluation of the bearing informaton of a bearing system comprising two or more direction finders.

In FIG. 5 there is shown, by way of example, a picture plate for evaluating the bearing information of a bearing system consisting of two direction finders. The direction finders are positioned at points A and B and directly take bearings of e.g. an object C (FIG. 5a). It is assumed that the angle measured by the direction finder A amounts to 60°, and that measured by the direction finder B to 140°. The direction finders are located with a distance $a$ between each other. The directional information provided by the direction finders, is fed to the picture plate shown in FIG. 5 in such a way that voltage is applied to the curves corresponding to the two measured angles, hence to the conductive line raster labelled "60°" extending from point A' and imprinted on the front side of the picture plate, and to the conductive line raster labelled "140°" extending from point B' and imprinted on the back side of the picture plate. Consequently, the picture plate is illuminated at the point of intersection of the two curves, namely at point C'. The illuminated picture point is imaged on the reading plates, which may be arranged as e.g. shown in FIG. 1, so that a voltage is produced in both strips of the two reading plates, which strips correspond to the coordinate value of the picture point. The two voltage-conducting strips indicate the coordinate value of the object C in the rectangle included in the picture plate and outlined by the dashlines in FIG. 5a.

In such types of picture plates the light intensity of the illuminated picture points or respectively the value of the voltage produced in the reading plates, which corresponds to the light intensity, can be used for evaluating the accuracy of the received measuring results.

The accuracy of a received directional information, as is known per se, decreases as the distance from the base increases, and is in proportion to the sine wave of the angle of intersection. As the light intensity of a lighted crossing point is likewise in proportion to the sine function of the angle of intersection between the two straight lines crossing each other, which is easily to be recognized from the fact that in the case of a crossing point with a very acute angle not only the actual crossing point, but also its surroundings in which the crossing curves are lying very close to one another, is illuminated, the light intensity can be used in a particularly simple manner as a scale for valuating the accuracy of the directional information. If furthermore the points of origin of the individual curves, as in the case of the picture plate shown in FIG. 5, which are to be brought into connection with the source of control voltage, are arranged round the points A' and B' equivalent to the sites or locations of the direction finders, hence in regions of a maximum accuracy, and if the line resistance of the individual curves is so dimensioned that the light intensity of the lighted crossing points decreases in accordance with a fixed predetermined function as the distance from the points of origin increases, hence as the distance from the base of the bearing system increases, then the light intensity of the lighted crossing points serves as a measure for the accuracy of the directional information.

Figure 6A:
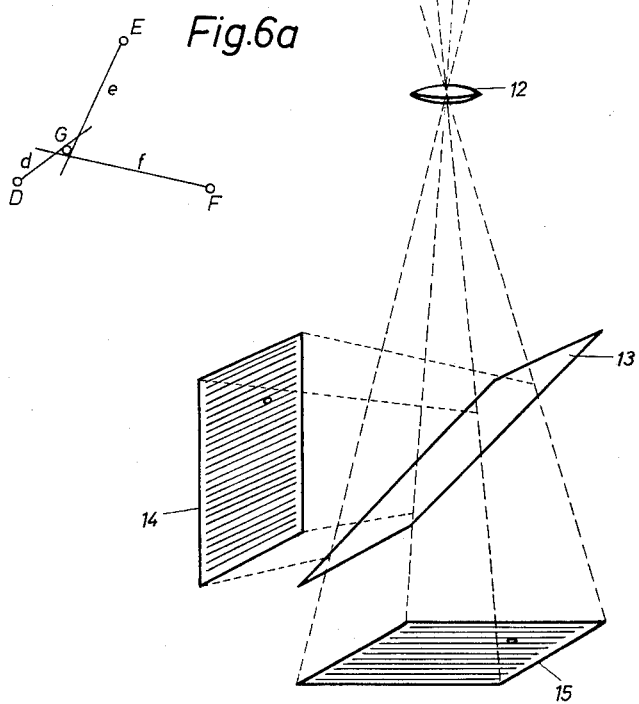

FIG. 6 shows an inventive type of arithmetic unit used for evaluating the measuring results of a bearing system comprising three direction finders, in which picture points are projected on to the reading plate with the aid of a projector. The arithmetical operations carried out by such an arithmetic unit are generally known as triangulators to carry out trigonometric calculations. In FIG. 6a there are schematically represented the locations of the three direction finders D, E and F as well as their direction-finding beams d, e and f and the located object G. Assuming now that the three direction-finding beams d, e and f deviate from the correct direction in a manner mentioned hereinbefore, so that, as may be seen from FIG. 6a, there result instead of one point of intersection three points of intersection between the three direction-finding beams. By the arrangement shown in FIG. 6a it will now be shown in what way a bearing information corresponding to the highest probability can be obtained from the direction-finding beams of their angles respectively crossing each other at three points of intersection. The directional information provided by respectively two direction finders is fed to each time one of the picture plates 4, 5 and 6, that is, the information provided by the direction finders D and E to the picture plate 4, that provided by the direction finders D and F to the picture plate 5, and that provided by the direction finders E and F to the picture plate 6. The picture plates 4, 5 and 6, in their construction, correspond to the picture plate shown in FIG. 5 with the exception that the points from which the line rasters extend in a beam-like manner and which correspond to the locations of the direction finders, are arranged on the individual picture plates in such a way that the straight lines connecting these points, when being represented on the reading plate, would form a closed triangle whose corner points would correspond to the representation of these points, hence to the points D', E', and F'. Of course, it is also possible that instead of these special types of picture plates in which the arrangement of the mentioned points, e.g. D', E', is respectively of a different kind, there are used standard types of picture plates, e.g. in a design as shown in FIG. 5, and that it can be effected by correspondingly shifting and turning that the lines connecting the mentioned points, form the desired closed triangle upon representation on the reading plate. Such an embodiment of an inventive type of arithmetic unit comprising displaceable and turnable standard picture plates has the added advantage that on the reading plate any triangle may be formed by correspondingly turning or displacing the individual plates, so that the arithmetic unit can be easily adjusted to a changed position of the direction finders.

The directional information fed to the picture plates 4, 5 and 6 effect an illumination of the picture plates at the points 7, 8 and 9. The picture points 7, 8 and 9 are projected on to the two reading plates 14 and 15 with the aid of a projector consisting of the two semi-transparent mirrors 10 and 11, as well as of the lens 12 and the semi-transparent mirror 13. The one of these reading plates serves to issue the abscissa value, while the other reading plate serves to issue the ordinate value of the bearing information. The reading plates 14 and 15 may be designed e.g. in a way similar to those shown in FIGS. 3 and 4. Instead of the two reading plates 14 and 15 and the semi-transparent mirror 13, however, there may also be provided a television camera tube capable of being scanned, such as an iconoscope or orthicon. The picture points are equally distributed on both reading plates around the proper coordinate value, in the same way as the points of intersection of the direction-finding beams d, e and f are distributed in FIG. 6a around the located object G. The light intensity of the image of the picture point effected by the direction-finding beams e and f, hence, the picture point 9, then reaches its highest value, because the point of intersection between both direction-finding beams amounts to an angle of almost 90°, while the light intensity of the image of the picture point effected by the direction-finding beams d and e, hence of the picture point 7, is relatively small because the angle of intersection of the two direction-finding beams d and e is very acute. By means of an evaluating device connected to the reading plate it is easily possible, if the voltages supplied by the photoelectrical strips of the reading plates and corresponding to the light intensity of the imaged picture points, are taken as a basis, to carry out the formation of the mean value by evaluating the magnitude of these voltages.

Instead of optically projecting the picture points of several picture plates on to only one reading device, as in the arithmetic unit shown in FIG. 6, hence to effect the superposition of the individual picture points with optical means, it is also possible to electrically connect in parallel a corresponding number of autonomous picture plate systems in which one reading device is provided for each picture plate, in such a way that respectively the corresponding outputs of the reading devices of the individual picture-plate systems are connected in parallel so that the superposition of the individual picture points or of the output currents corresponding to the light intensity of these picture points is effected electrically.

FIG. 7 schematically shows an arrangement equivalent to the arithmetic unit shown in FIG. 6. In such a type of arrangement as represented in FIG. 7, the voltages of the light intensity produced by the individual picture points in the different reading devices effect the establishment of currents in proportion to the picture points producing these currents, which are then electrically added by connecting the corresponding outputs of the reading devices in parallel. Also in the case of such an arrangement it is possible to adapt the arithmetic unit quickly to a changed position of the direction finders by turning and displacing the picture plates with respect to the reading devices. However, in comparison with the example of embodiment shown in FIG. 6, there exists the disadvantage that no standard plates can be used, but that in the case of a variation of the base distance of the direction finders, picture plates have to be used with a correspondingly adapted base length, because an optical adaptation of the base length, which is possible in the example of embodiment shown in FIG. 6, cannot be carried out in the case of a construction according to FIG. 7. Consequently, arithmetic units of the type shown in FIG. 6 are particularly suitable for direction-finding systems in which the positions of the direction finders are variable and in which the arithmetic unit must be quickly adapted to these changed positions, while arithmetic units constructed according to FIG. 7 are particularly suitable for direction-finding systems employing stationary direction finders. In comparison with the example of embodiment shown in FIG. 6, the one according to FIG. 7 has the advantage of having a substantially simpler construction and a higher degree of accuracy because, on one hand, error probabilities which always exist where optical projectors are used are avoided and because, on the other hand, the reading devices can be of a substantially less sensitive type since the picture points can be imaged on the reading devices with practically the light intensity existing at the source of radiation, hence unweakened, whereas in the case of the example of embodiment shown in FIG. 6, the light intensity of the picture points as imaged on the reading device, due to the considerable distance between the reading device and the picture plates, as well as due to the weakening caused by the projector, is substantially lower than the light intensity of the source of radiation. Accordingly, in the case of the example of embodiment of FIG. 6 there have to be used very sensitive reading devices, whereby reflections and external light still cause further error probabilities. A further advantage of the type of embodiment shown in FIG. 7 resides in a substantially lower space requirement as compared with the arithmetic unit shown in FIG. 6.

FIG. 8 shows an evaluating arrangement to evaluate and form the mean value of the results provided by one or more reading plates of the same coordinate direction.

The evaluating arrangement shown in FIG. 8 is suitable e.g. to evaluate the results as obtained from the arithmetic units according to FIGS. 1, 6 and 7, and simultaneously forms the wanted mean value in cooperation with the arithmetic units according to FIG. 6 or 7.

The mode of operation of the evaluating arrangement shown in FIG. 8 is described in connection with the arithmetic unit according to FIG. 7. Assuming now a bearing system consisting of three direction finders to provide the directional information for the three picture plates of the arithmetic unit shown in FIG. 7, and the directional information to result in three picture points respectively deviating somewhat from each other in position, e.g. in an arrangement corresponding to the points of intersection of the direction-finding beams as shown in FIG. 6a. The picture points are thereby assumed to have the coordinates $x_1/y_1$, $x_2/y_2$ and $x_3/y_3$, and to effect in the strips of the reading plates corresponding to these coordinate values, the currents $J_1$, $J_2$ and $J_3$ which are in proportion to their light intensity.

The evaluating arrangement is now supposed to form the mean value of $x_1$, $x_2$ and $x_3$ or $y_1$, $y_2$ and $y_3$ by evaluating the light intensity, hence the value of the currents $J_1$, $J_2$ and $J_3$.

A generally known and customary function to form the mean value $b_m$ from a sum of $n$ elements $b_\nu$ to be respectively evaluated with $a_\nu$, is as follows:

$$b_m = \frac{\sum_{\nu=1}^{n} a_\nu b_\nu}{\sum_{\nu=1}^{n} a_\nu}$$

Applied to the present case, e.g. the mean value results from the sum of the values $x_1$, evaluated with $J_1$, and $x_2$, evaluated with $J_2$, and $x_3$, evaluated with $J_3$ as follows:

$$x_m = \frac{J_1 x_1 + J_2 x_2 + J_3 x_3}{J_1 + J_2 + J_3}$$

The evaluating arrangement, therefore, must be capable of forming $x_m$ from the currents $J_1$, $J_2$ and $J_3$, which are each time delivered on the respective coordinate lines $x_1$, $x_2$ and $x_3$ in accordance with the abovementioned function.

To this end, therefore, the evaluating arrangement has to multiply the current $J_1$ with the associated coordinate value $x_1$, and respectively $J_2$ with $x_2$, and $J_3$ with $x_3$; has to add the thus obtained currents which are multiplied with the corresponding coordinate value; and has to feed the thus obtained sum current, on one hand, as well as the sum current resulting from the addition of the currents $J_1$, $J_2$ and $J_3$, on the other hand, to a quotient former adapted to divide the first sum current by the latter, and as a result this quotient former delivers e.g. a voltage corresponding to the value $x_m$.

To carry out the first step in the multiplication of the currents $J_\nu$ with the coordinate value $x_\nu$ of the coordinate line on which the current $J_\nu$ is supplied, there is provided for each coordinate line an amplifier circuit, e.g. the transistor circuit (FIG. 8) consisting of the resistors R, $x_\nu.R$ and $T_\nu$; the current $J_\nu$ flowing across the resistance $x_\nu.R$ produces at this resistance a voltage $U_\nu = J_\nu.x_\nu.R$ which is applied with practically the same amplitude to the emitter resistance R of the transistor $T_\nu$ and, consequently, determines the emitter current or the collector current which is pratcically equal thereto, i.e. to be $$J_{C\nu} \approx J_{E\nu} = \frac{U_\nu}{R} = x_\nu \cdot J_\nu$$

At the output of the amplifier circuit $\nu$, consequently, there is flowing, as provided, $J_{C\nu} = x_\nu J_\nu$.

To carry out the second step, i.e. the addition of the currents multiplied with the corresponding coordinate value, the outputs of all amplifiers provided for respectively one coordinate line, are connected in parallel, hence in FIG. 8 the collector electrodes of all transistors are connected to one common output line. The thus formed sum current flows via the battery B (FIG. 8) and the resistor $Z_1$ to ground and produces across the resistor $Z_1$ a voltage drop $$U_{Z_1} = Z_1 \cdot \sum_{\nu=1}^{n} x_\nu \cdot J_\nu$$

or in the case of the described example:

$$U_{Z_1} = Z_1 (J_1 x_1 + J_2 x_2 + J_3 x_3)$$

To carry out the third step, namely that of performing the simple addition of currents $J_\nu$, hence the formation of the sum $$\sum_{\nu=1}^{n} J_\nu$$

the earth conductors (e.g. 16, 17 and 18, FIG. 7) of the reading plates (e.g. 19, 20 and 21, FIG. 7) belonging to the one coordinate direction, are connected to one another. At point E (FIG. 7) there will then be flowing the sum of all currents flowing in one coordinate direction, that is, in the case of the discussed example: $J_1+J_2+J_3$. The thus formed sum current flows through point E' (FIG. 8) connected e.g. to point E (FIG. 7), via the resistor $Z_2$ to ground, and produces a voltage drop across resistor $Z_2$.

$$U_{Z_2} = z_2 \cdot \sum_{\nu=1}^{n} J_\nu$$

or, in the case of the discussed example:

$$U_{Z_2} = Z_2 \cdot (J_1+J_2+J_3)$$

As $Z_1=Z_2=Z$ is chosen the voltages $$U_{Z_1}=Z(J_1x_1+J_2x_2+J_3x_3) \text{ and } U_{Z_2}=Z(J_1+J_2+J_3)$$

are applied to the resistors $Z_1$ and $Z_2$. The voltages $U_{Z_1}$ and $U_{Z_2}$ are fed to the quotient former Q, which divides the first mentioned voltage by the last mentioned voltage and, in the given example, provides a voltage $U_m$ (FIG. 8) in proportion to the quotients of both voltages at the output.

$$U_m = U_o \cdot \frac{U_{Z_1}}{U_{Z_2}} = U_o \frac{J_1x_1+J_2x_2+J_3x_3}{J_1+J_2+J_3} = U_o x_m$$

This voltage which is related to its reference value $U_o$ which, e.g. may be $U_o=1V$, will then result in the wanted mean value $x_m$:

$$\frac{U_m}{U_o} = x_m$$

Of course, such a type of evaluating arrangement can also be used to evaluate the results of arithmetic units employing one picture plate and one reading plate only, as shown in FIG. 1 for example.

This is recommendable especially in cases where the picture points are imaged in such a way on the reading plate that not only one, but several photoelectrical strips are illuminated. This will always be the case when a picture point just falls on the border line between two strips. When using an evaluation arrangement the individual strips also do not need to be so narrow, because the evaluating arrangement is also capable of forming mean values between two coordinate values which are assigned to two strips lying next to each other.

FIG. 9 shows an inventive type of arithmetic unit in which the imaging function of imaging the families of curves 22 imprinted on the picture plate 21, on to the reading plate 23 is variable in such a way that the abscissa can be bulged by turning the picture plate round the point P'. Thus, for example, a family of concentrical circles 22 imprinted on the picture plate 21 is imaged on the reading plate 23 as a family of ellipses 24 with a constant ellipticity coefficient. The lenses 25 and 26 are thereby used for the imaging purpose, and the first one of which focuses the parallel-extending beams.

Generally, an arithmetic unit of this type can be designed in a way that the function of imaging the families of curves imprinted on the picture plate upon the reading plate is a function of the variable plotted in the abscissa or ordinate direction of the plane of the picture plate. For establishing this imaging function, on one hand, it is possible to use the projector but, on the other hand, also the opposite position of the picture and reading plate. Such types of arithmetic units with a variable imaging function can be advantageously used in all cases where it is the problem to provide a quick adaptation to changed conditions.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A computing device for deriving a function of two independent variables comprising:
   a plate of electroluminescent material;
   first and second intersecting pluralities of electrically conductive line patterns, comprising graphic representations of said independent variables, disposed adjacent opposite faces of said plate, the points of intersection of said lines in said respective patterns lying within said plate;
   said points determining selectively luminescent regions within said plate in association with selective electrical excitation of said intersecting lines;
   means for selectively applying electrical signals to said lines; and
   first and second reading plates positioned parallel to and adjacent said electroluminescent plate, said reading plates containing thereon respective first and second relatively orthogonal families of line curves composed of photoconductive material.

2. A computing device for deriving a function of two independent variables comprising:
   a plate of electroluminescent material;
   first and second intersecting pluralities of electrically conductive line patterns, comprising graphic representations of said independent variables, disposed adjacent opposite faces of said plate, the points of intersection of said lines in said respective patterns lying within said plate;
   said points determining selectively luminescent regions within said plate in association with selective electrical excitation of said intersecting lines;
   means for selectively applying electrical signals to said lines; and
   first and second reading plates having associated first and second pluralities of lines of photoconductive material disposed in a predetermined coordinate relationship thereon, said first and second reading plates being situated to receive light issuing from said electroluminescent plate at corresponding regions of said reading plates whereby a predetermined coordinate transformation is effected between the coordinate system represented by the electrically excited lines determining the point of issuance of said light and that coordinate system represented by the photoconductive lines in said respective reading plates which are excited by said issuing light.

3. A device according to claim 2 in which the said first and second pluralities of electrically conductive lines adjacent said electroluminescent plate form respective first and second families of orthogonal coordinate defining curves in a first system of orthogonal coordinates, and in which the said first and second pluralities of photoconductive lines on said respective first and second reading plates form respective third and fourth families of orthogonal coordinate defining curves in a second system of coordinates different from the said first system.

4. A device according to claim 3 in which the said first family of curves includes concentric circles and the said second family of curves includes circular arc segments orthogonal to all of the said circles at different radial positions.

5. A device according to claim 2 in which one of the said pluralities of electrically conductive lines adjacent said electroluminescent plate includes a plurality of electrically isolated curves emanating from a given common sub-region of origin within said plate, the resistivities of said lines being such that electrical signals applied thereto at the said region of origin are attenuated in accordance with distance in relation to said origin to cause the luminescence in said plate to vary in accordance with the position of the luminescence relative to said origin, so that the intensity of luminescence provides an additional criterion for evaluating the selection of said intersecting lines.

6. A device comprising:
a plurality of electroluminescent plates arranged according to claim 2;
means responsive to light emanating from said selectively luminescent points for variably producing electrical signals in accordance with a predetermined function of the position of said emanating light in relation to said plate; and
means for superimposing images of the luminescence emanating from said plurality of plates at said means responsive whereby the response of said means responsive is determined by the mean position and intensity of the said luminescences.

7. A device according to claim 6 in which corresponding ones of the said pluralities of line patterns on the said electroluminescent plates are electrically connected in parallel.

8. A device including a plurality of electroluminescent plates and reading plates as defined in claim 2, said respective reading plates having like positioned lines electrically connected in parallel in each coordinate direction in said second-mentioned system of coordinates, said device further including means for electrically adding the outputs from said reading plates.

References Cited by the Examiner
UNITED STATES PATENTS

| | | | |
|---|---|---|---|
| 2,415,190 | 2/47 | Rajchman | 235—197 X |
| 3,042,834 | 7/62 | Nicoll | 250—213 X |
| 3,046,540 | 7/62 | Litz et al. | |
| 3,145,368 | 8/64 | Hoover | 340—173 |

MALCOLM A. MORRISON, *Primary Examiner.*
WALTER W. BURNS, Jr., *Examiner.*